United States Patent
Ghazal

(10) Patent No.: US 9,808,087 B1
(45) Date of Patent: Nov. 7, 2017

(54) SUN-BATHING MAT WITH INTEGRATED ANGLED HEADREST

(71) Applicant: Sameh Ghazal, Orlando, FL (US)

(72) Inventor: Sameh Ghazal, Orlando, FL (US)

( * ) Notice: Subject to any disclaimer, the term of this patent is extended or adjusted under 35 U.S.C. 154(b) by 0 days.

(21) Appl. No.: 15/083,517

(22) Filed: Mar. 29, 2016

(51) Int. Cl.
*A47C 1/14* (2006.01)
*A47G 9/06* (2006.01)
*H02S 20/30* (2014.01)

(52) U.S. Cl.
CPC ............... *A47C 1/14* (2013.01); *A47G 9/062* (2013.01); *H02S 20/30* (2014.12)

(58) Field of Classification Search
CPC ........ A47G 9/062; E04H 15/003; A47C 1/146
See application file for complete search history.

(56) References Cited

U.S. PATENT DOCUMENTS

| | | | | |
|---|---|---|---|---|
| 33,385 | A * | 10/1861 | Lerett | A45F 4/06 224/156 |
| 4,474,407 | A * | 10/1984 | Nazar | A47C 1/146 297/183.3 |
| 5,022,107 | A | 6/1991 | Knotts | |
| 5,076,405 | A | 12/1991 | Modica | |
| 5,121,961 | A * | 6/1992 | Marshall | A47C 1/143 297/17 |
| 5,435,025 | A * | 7/1995 | Gerard | A47G 9/062 5/417 |
| D382,755 | S | 8/1997 | Knopfler | |
| 5,774,912 | A * | 7/1998 | Dominique | A45C 3/10 383/4 |
| 6,018,960 | A | 2/2000 | Parienti | |
| 6,895,614 | B1 * | 5/2005 | Peck | A47C 17/045 5/419 |
| 7,621,005 | B1 | 11/2009 | Harvey | |
| 8,002,349 | B1 | 8/2011 | Pizzuto | |
| 9,039,077 | B1 * | 5/2015 | Santamaria | A47C 7/72 297/31 |
| 9,173,493 | B1 * | 11/2015 | Fulton | A47C 7/66 |
| 2006/0082198 | A1 * | 4/2006 | Mafrice | A47C 1/146 297/217.4 |
| 2008/0250568 | A1 * | 10/2008 | Wu | A47C 1/146 5/655.3 |
| 2010/0262050 | A1 * | 10/2010 | Gasparovich | A47C 21/006 601/57 |
| 2017/0042349 | A1 * | 2/2017 | Batros | A47G 9/062 |
| 2017/0086605 | A1 * | 3/2017 | Wolfe | A47G 9/062 |

\* cited by examiner

*Primary Examiner* — David E Sosnowski
*Assistant Examiner* — Eric Kurilla

(57) ABSTRACT

The sunbathing mat with integrated angled headrest is adapted for use in sunbathing. The sunbathing mat with integrated angled headrest is a portable sunbed that is further equipped with a thermal pocket that is adapted for use in storing beverages and one or more photovoltaic cells that are adapted to provide power through a USB port. The sunbathing mat with integrated angled headrest comprises a mat, a thermal pocket, one or more photovoltaic cells, a USB port, and a voltage regulator.

7 Claims, 4 Drawing Sheets

SUN-BATHING MAT WITH INTEGRATED ANGLED HEADREST

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of household and table equipment, more specifically, travelling chair or mat.

SUMMARY OF INVENTION

The sunbathing mat with integrated angled headrest is adapted for use in sunbathing. The sunbathing mat with integrated angled headrest is a portable sunbed that is further equipped with a thermal pocket that is adapted for use in storing beverages and one or more photovoltaic cells that are adapted to provide power through a USB port.

These together with additional objects, features and advantages of the sunbathing mat with integrated angled headrest will be readily apparent to those of ordinary skill in the art upon reading the following detailed description of the presently preferred, but nonetheless illustrative, embodiments when taken in conjunction with the accompanying drawings.

In this respect, before explaining the current embodiments of the sunbathing mat with integrated angled headrest in detail, it is to be understood that the sunbathing mat with integrated angled headrest is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sunbathing mat with integrated angled headrest.

It is therefore important that the claims be regarded as including such equivalent construction insofar as they do not depart from the spirit and scope of the sunbathing mat with integrated angled headrest. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
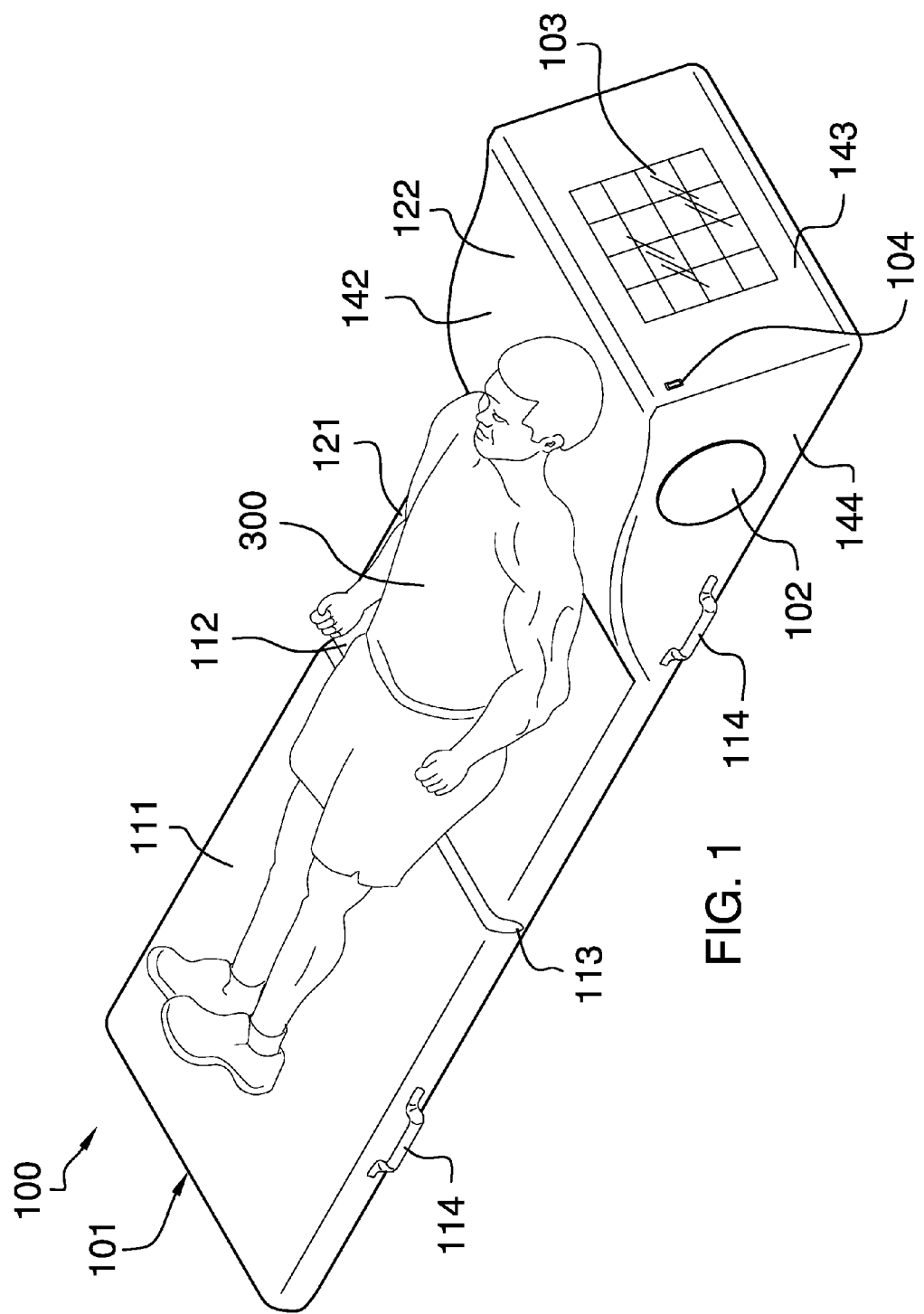
FIG. 1 is a perspective view of an embodiment of the disclosure.
Figure 2:
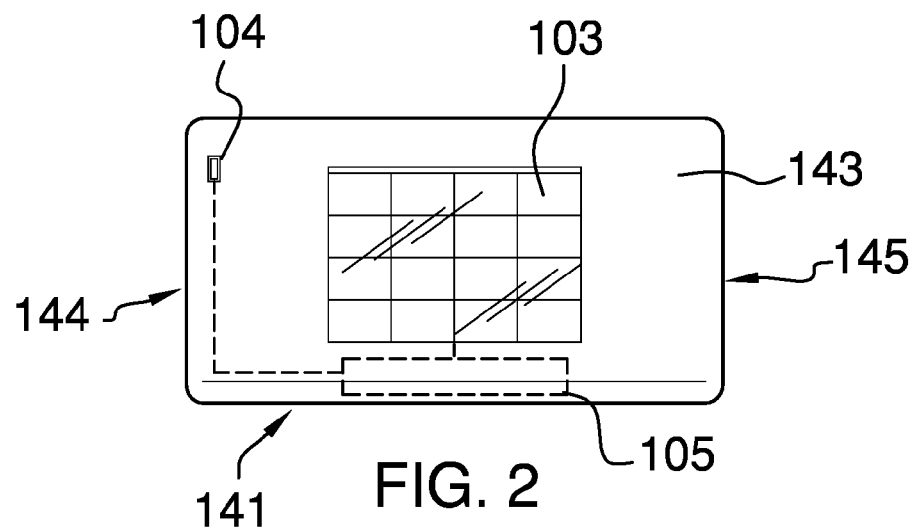
FIG. 2 is a rear view of an embodiment of the disclosure.
Figure 3:
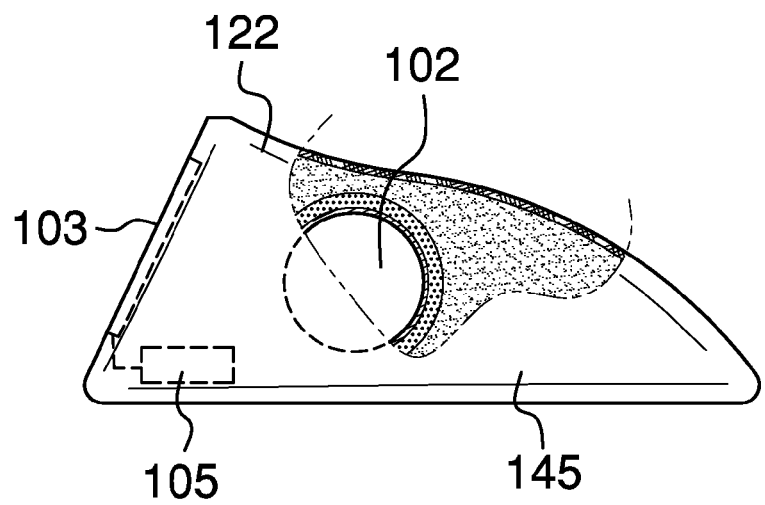
FIG. 3 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5.

The sunbathing mat with integrated angled headrest 100 (hereinafter invention) comprises a mat 101, a thermal pocket 102, one or more photovoltaic cells 103, a USB port 104, and a voltage regulator 105. The invention 100 is adapted for use by a person 300 when sunbathing. The invention 100 is a portable mat 101 that is further equipped with a thermal pocket 102 that is adapted for use in storing beverages and/or foodstuffs 177 and one or more photovoltaic cells 103 that are adapted to provide power through a USB port 104.

Figure 4:
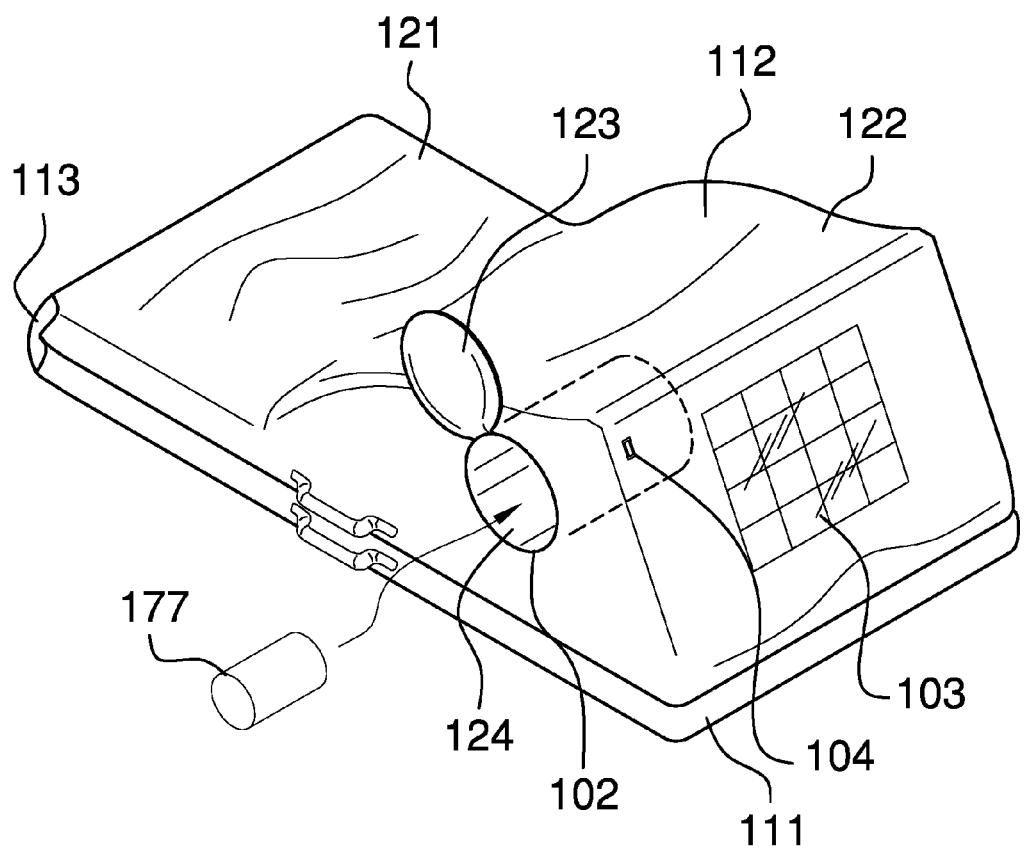
FIG. 4 is a perspective view of an embodiment of the disclosure.
Figure 5:
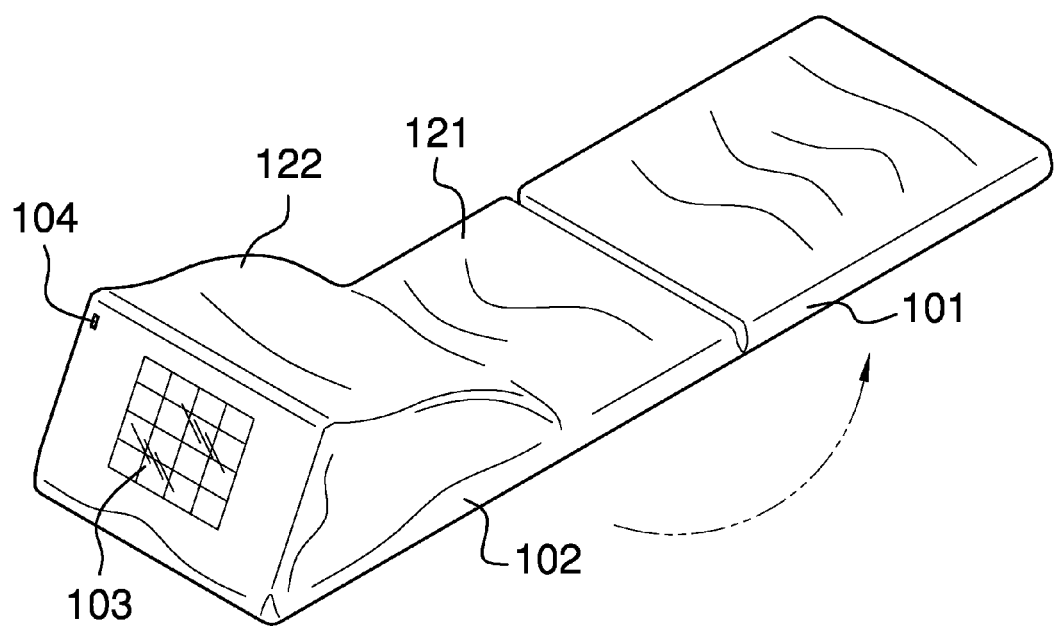
FIG. 5 is a perspective view of an embodiment of the disclosure.

The mat 101 is a protective structure that is placed on the ground such that the person can sit on the mat 101. The mat 101 further comprises a first pad 111, a second pad 112, a backing 113, and a plurality of handles 114. The first pad 111 is a cushion that is formed in the shape of a rectangular block and that is filled with padding material. The purpose of the first pad 111 is to protect the legs of the person while sunbathing. The first pad 111 is attached to the second pad 112 using the backing 113. In the first potential embodiment of the disclosure, as shown most clearly in FIG. 4, the backing 113 is a textile webbing that is used to join the first pad 111 to the second pad 112 such that the first pad 111 can rotate relative to the second pad 112 in a manner that allows the first pad 111 to rotate underneath the second pad 112 using the backing 113 as a pivot. The backing 113 can be attached to the first pad 111 and the second pad 112 using a sewn seam or an adhesive. As shown in FIG. 4, the backing 113 is attached to the invention 100 such that the backing 113 is in contact with the ground while the invention 100 is in use.

The second pad 112 is a cushion that further comprises a seat 121, a headrest 122, a door 123, and a cavity 124. The seat 121 is a cushion that is formed in the shape of a rectangular block and that is filled with padding material. The purpose of the seat 121 is to receive and protect the buttocks of the person while sunbathing. The seat 121 is formed as a single unit with the headrest 122. The headrest 122 is a five surfaced structure that is formed in the shape of an irregular prism. The headrest 122 is further defined with a first surface 141, a second surface 142, a third surface 143, a fourth surface 144, and a fifth surface 145. The fourth surface 144 and the fifth surface 145 are the corresponding surfaces of the irregular prism that forms the headrest 122. During normal use, the first surface 141 rests in contact with the ground and the second surface 142 is at an incline relative to the seat 121 such that the person can recline onto the headrest 122 and have their back supported. The third surface 143 has mounted on it the one or more photovoltaic cells 103 and the USB port 104. The headrest 122 is formed from a neoprene material that feels soft against the back when it is leaned against.

A plurality of handles 114 are mounted on the first pad 111 and the second pad 112. The plurality of handles 114 provide grips for use in transporting the invention 100. At a minimum, a first handle selected from the plurality of handles 114 is attached to the first pad 111. At a minimum, a second handle selected from the plurality of handles 114 is attached to the second pad 112.

The neoprene material of the headrest 122 also acts as in insulating material that is used to insulate items that are stored in thermal pocket 102. The thermal pocket 102 further comprises a cavity 124 and a door 123. The cavity 124 is a hollow space that is formed within the headrest 122 for the purpose of storing beverages and other items in an insulated location. The cavity 124 is accessible from the exterior of the headrest 122 and is covered with the door 123. The door 123 is a removable barrier that blocks access into the cavity 124 when such access is not required. Methods to form cavities in neoprene and to cover cavities with barriers are well known and documented in the mechanical arts.

One or more photovoltaic cells 103 are attached to the third surface 143 of the headrest 122 such that the one or more photovoltaic cells 103 receive sunlight and can be used to generate electricity. This electricity is routed to the USB port 104 such that the USB port 104 can be used to power electronic devices. In a second potential embodiment of the disclosure, the invention 100 further comprises a voltage regulator 105. The voltage regulator 105 is used in the circuit between the one or more photovoltaic cells 103 and the USB port 104 to condition and regulate the output voltage of the USB port 104. Methods to regulate electricity flow from photovoltaic cells are well known and documented in the electrical arts.

To use the invention 100, the invention 100 is laid out and the invention 100 is used as a normal sunbed. The USB port 104 is used normally for powering devices. Items can be stored in the thermal pocket 102 in a manner similar to how one would use a cooler.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Correspond: As used in this disclosure, the term correspond is used as a comparison between two or more objects wherein one or more properties shared by the two or more objects match, agree, or align almost exactly.

Cushion: As used in this disclosure a cushion is a pad or pillow formed from soft material that is used for resting, sleeping, or reclining.

Handle: As used in this disclosure, a handle is an object by which a tool, object, or door is held or manipulated with the hand.

Pad: As used in this disclosure, a pad is a mass of soft material used as a filling or for protection against damage or injury.

Photovoltaic Cell: As used in this disclosure, a photovoltaic cell is an electrical device that directly converts light energy into electrical energy.

Port: As used in this disclosure, a port is an electrical termination that is used to connect a first electrical circuit to a second external electrical circuit. In this disclosure, the port is designed to receive a plug.

Prism: As used in this disclosure, a prism is a 3 dimensional geometric structure wherein the form factor of two faces of the prism correspond to each other. In this disclosure, when further description is required a prism will be named for the geometric name of the form factor of the two corresponding faces. If the form factor of the two corresponding faces has no clearly established or well-known geometric name, the term irregular prism will be used.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Strip: As used in this disclosure, the term describes a long and narrow object of uniform thickness that appears thin relative to the length of the object.

Textile: As used in this disclosure, a textile is a material that is woven, knitted, braided or felted. Synonyms in common usage for this definition include fabric and cloth.

Unregulated Voltage: This refers to a source of DC voltage that changes in response to changes to the circuit's input power supply voltage or to changes in output, or load, current.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

Voltage Regulator: This refers to an electrical circuit that takes unregulated voltage as its power input and provides a constant output voltage, often referred to as a conditioned voltage, independent of variations to input power supply voltage or output, or load, current.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable structure comprising:

a mat, a thermal pocket comprising a door and a cavity, one or more photovoltaic cells, and a USB port;

wherein the portable structure is adapted for use by a person when sunbathing;

wherein the portable structure rests on a supporting surface;

wherein the thermal pocket is adapted for use in storing beverages and/or foodstuffs;

wherein the one or more photovoltaic cells are adapted to provide power through a USB port;

wherein the mat further comprises a first pad, a second pad, a backing, and a plurality of handles;

wherein the first pad is a cushion;

wherein the first pad is formed in the shape of a rectangular block;

wherein the backing attaches the first pad to the second pad;

wherein the backing is a textile webbing;

wherein the backing attaches the first pad to the second pad such that the first pad can rotate relative to the second pad in a manner that allows the first pad to rotate underneath the second pad using the backing as a pivot;

wherein the backing is positioned such that the backing is in contact with the supporting surface;

wherein the second pad is a cushion;

wherein the second pad further comprises a seat, a headrest, and the thermal pocket;

wherein the thermal pocket is formed in the headrest and the headrest is a five surfaced structure that is formed in the shape of an irregular prism;

wherein the headrest is further defined with a first surface, a second surface, a third surface, a fourth surface, and a fifth surface;

wherein the fourth surface and the fifth surface form a height of the headrest, the cavity extends through the fourth surface, and during normal use the first surface rests in contact with the ground and the second surface is at an incline relative to the seat; and wherein the one or more photovoltaic cells and the usb port are mounted on the third surface.

2. The portable structure according to claim 1 wherein the backing is attached to the first pad and the second pad using a method selected from the group consisting of the use of a sewn seam or the use of an adhesive.

3. The portable structure according to claim 1 wherein the seat is formed in the shape of a rectangular block.

4. The portable structure according to claim 3 wherein the seat is formed as a single unit with the headrest.

5. The portable structure according to claim 1 wherein the portable structure further comprises a voltage regulator;

wherein the USB port receives electric power from the one or more photovoltaic cells;

wherein the electric power received by the USB port from the one or more photovoltaic cells is conditioned using the voltage regulator.

6. The portable structure according to claim 5 wherein the headrest is formed from neoprene.

7. The portable structure according to claim 6 wherein one or more handles selected from the plurality of handles is attached to the first pad;

wherein one or more handles selected from the plurality of handles is attached to the second pad.

* * * * *